United States Patent Office 3,541,128
Patented Nov. 17, 1970

3,541,128
PERFLUOROALKYL HYDROPEROXIDES AND DERIVATIVES THEREOF
Richard L. Talbott, White Bear Lake, Minn., assignor to Minnesota Mining & Manufacturing Company, St. Paul, Minn., a corporation of Delaware
No Drawing. Continuation-in-part of application Ser. No. 448,575, Apr. 12, 1965. This application July 25, 1966, Ser. No. 568,369
Int. Cl. C07c 73/06
U.S. Cl. 260—453
9 Claims

ABSTRACT OF THE DISCLOSURE

Perfluoroalkyl hydroperoxides are provided together with derivatives thereof in which they are formally coupled with F—$CO_2H$, HCN, $CF_3CO_2H$, $H_2CO_3$ and $(HO)_2CFOF$. These compounds are useful as oxidizing agents.

This application is a continuation-in-part of, and is divided from, my copending application Ser. No. 448,575, filed Apr. 12, 1965, now abandoned.

This invention relates to fluorinative oxidation products.

The reactions of fluoroxy compounds or oxyfluorides are not well understood. A process for the preparation of trifluoromethyl hypofluorite, also known as fluoroxy trifluoromethane or trifluoromethyl oxyfluoride, is described by Cady and Kellogg in U.S. Pat. No. 2,689,254. Cady and various coworkers have investigated this compound and its reactions reporting the results in numerous articles in the Journal of the American Chemical Society, viz, 70, 3986 (1948); 75, 2501 (1953); 79, 5625, 5628 (1957); 81, 1089 (1959); 82, 6005 (1960). One reaction is reported in Porter and Cady, U.S. Pat. No. 3,100,803. It has been reported that many reactions are violent or explosive. More recently, monofluoroxy compounds have been described by Prager and Thompson in the Journal of the American Chemical Society, vol. 87, page 230 et seq. (1965).

It is one object of the invention to provide novel partial reduction products of fluoroxy compounds.

Other objects of the invention will become apparent from the disclosure herein.

In accordance with the above and other objects of the invention it has been found that controlled fluorinative oxidations of many compounds with energized fluoroxy perfluoroalkanes provide reduction products of the latter which are, nonetheless, useful oxidants.

Energized fluoroxy compounds are those fluoroxy perfluoroalkanes of up to about 18 carbon atoms which are activated by the presence of an activating substituent on the carbon bearing the OF group. Neither fluorine nor a perfluoroalkyl group bonded through carbon effects activation or energization and "energized" does not refer to thermal instability. Some examples of energized fluoroxy compounds are 1,1-bis(fluoroxy)perfluoroalkanes such as bis(fluoroxy)perfluoromethane, which have a second fluoroxy group on the same carbon atom as, and activating, the first fluoroxy group, and 1-perfluoroalkylperoxy-1-fluoroxyperfluoroalkanes which have a perfluoroalkylperoxy group attached to the same carbon atom as, and activating, the fluoroxy group.

Products obtained using bis(fluoroxy)difluoromethane available inter alia by the fluorination of sodium oxalate, are considered exemplary of the products from presently less readily available homologous and other energized fluoroxy compounds available by the fluorination of other oxygen containing compounds.

When 1,1-bis(fluoroxy)perfluoroalkanes, $CF_2(OF)_2$ and $RCF(OF)_2$, in which a second fluoroxy group energizes a first fluoroxy group are used as oxidants, novel reduction products having the structures:

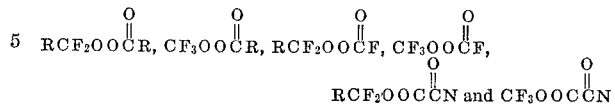

are produced, wherein R is perfluoroalkyl as hereinelsewhere broadly defined and contains from 1 to about 18 carbon atoms. When 1-perfluoroalkylperoxy-1-fluoroxyperfluoroalkanes

in which a perfluoroalkylperoxy group is the energizing group) are used as oxidants novel reduction products of the general formula

are produced wherein R' is perfluoroalkyl-$CF_2$.

The fluoroformate $$CF_3OOCF$$

is itself susceptible of fluorinative oxidation of the carbonyl group and/or hydrolysis by water to produce the several oxidants shown in the following diagram:

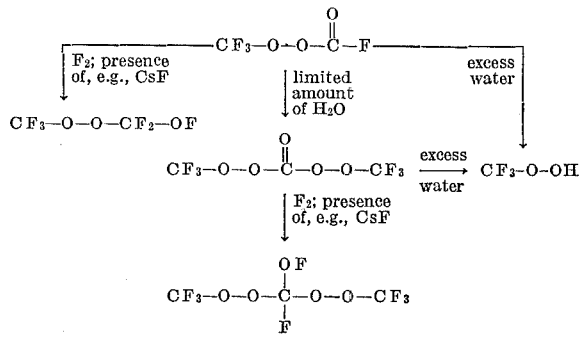

Similarly, compounds

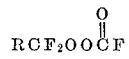

are transformed into

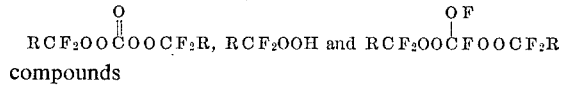

compounds

are transformed into $RCF_2OOH$ and $RCO_2H$; compounds

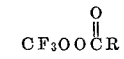

are transformed into $CF_3OOH$ and $RCO_2H$; and compounds

are transformed into $RCF_2OOH$, $CO_2$ and HCN.

It will be recognized that the cyanoformyl compounds are formed when a cyanide is used as catalyst in oxidations using energized fluoroxy compounds.

The R groups in the acyclic bis(fluoroxy)perfluoroalkanes may contain from 1 to about 18 carbon atoms.
Fully equivalent with these acyclic perfluoroalkyl radicals in the energized fluoroxy compounds used in the invention are perfluorinated carbocyclic and heterocyclic radicals, for example, perfluoropyridyl, perfluorocyclohexyl, perfluorocyclohexylethyl and the like radicals. Perfluoroalkyl radicals containing other atoms in the chain are also equivalent for the purposes of this invention; for example, peroxy, oxa, aza and the like atoms or groups of atoms can be present.

Likewise, the perfluoroalkyl radicals can be substituted by certain electronegative groups, which may replace one or more fluorine atoms or $CF_3$ groups. They are characterized by being free from hydrogen, non-reducing with respect to the —OF group, and having a Hammett meta sigma parameter equal to or greater than +0.3. (Reference is here made to the report of H. H. Jaffe, Chemical Reviews, vol. 53, pp. 191–261, 1953.) Such groups include

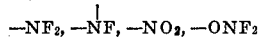

perchloryl, peroxy and the like groups.

The products of the invention are seen to have the general formula $[RCF_2OO]_nX$ wherein $n$ is 1 or 2, X is hydrogen, $$-\overset{O}{\underset{\|}{C}}R, \text{ or } -\overset{O}{\underset{\|}{C}}CN$$

when $n$ is 1 and X is $>C=O$ or $>CFOF$ when $n$ is 2, and wherein R is fluorine or perfluoroalkyl as hereinabove defined.

The invention is now further described by specific examples showing the practice of the invention. It will be understood that precautionary measures suitable to the reactants are within the skill of the art although set forth in some examples as a guide for those not fully conversant with such measures. In these procedures all precautions are not repeated at each point inasmuch as one should not attempt duplication of these procedures until he has achieved sufficient familiarity with the techniques used in the art to recognize that such procedures are necessary for personal safety. In these examples, pressures are indicated in millimeters of mercury although it will be recognized that these systems must not be contaminated by mercury vapors and gauges of suitable non-corrodible metals are therefore employed.

EXAMPLE 1

This example describes an oxidation carried out by the process of the invention with particularity as to convenient equipment and precautions in the manipulation of certain powerful oxidants which those skilled in the art will readily recognize as being necessary for safety although not limiting as to the reaction itself if safety be disregarded.

A clean, dry 10 ml. borosilicate glass reaction vessel equipped with a Fischer and Porter Teflon valve and a Teflon-covered magnetic stirring bar is charged with 454.8 mg. of dry reagent potassium cyanide. The reactor is then charged under reduced pressure at —110° C. with 5.95 mmoles of freshly distilled $CFCl_3$ and 2.48 mmoles of pure perfluoroguanidine (available from the fluorination of ammeline or guanidine salts.) The bath at —110° C. is removed, and the reactor contents are stirred thoroughly while the reactor warms to room temperature. When the suspension is thoroughly mixed, the reactor is cooled in a bath of liquid nitrogen. The reactor is charged under reduced pressure with 5.63 mmoles of pure bis(fluoroxy)perfluoromethane. The reactor is sealed with the Fischer and Porter valve and the liquid nitrogen bath is replaced by a bath initially at —110° C. This bath is allowed to warm slowly to room temperature overnight. The mixture is stirred as it warms to room temperature.

It is convenient and prudent to provide explosion shields around such reaction vessels. In the case of small reactors a cloth or fiberglass shatter-bag with drawstrings may be used to enclose the vessel during the warming. With reactors of the size of this example, barricades or shields of plastic or shatterproof glass are provided.

The mixture is then stirred at room temperature for eight hours and is kept thereafter at —78° C. until worked up.

The volatile products in the reaction mixture are distilled from the reaction vessel and transferred to the vacuum line under reduced pressure. There is obtained 12.6 mmoles of volatile material. Analysis of a portion of this sample by fluorine NMR spectroscopy shows that the reaction has gone to completion and all of the perfluoroguanidine has been consumed.

The components of the product mixture are separated and isolated by means of vapor phase chromatography. For this purpose a column 3 meters in length and ½ inch in diameter packed with perfluorotributylamine (33%) coated on acid-washed diatomaceous earth (e.g., Celite; 67%) is used. The column is operated at —30° C. An 8-volt thermistor is used as a detector and dry helium is used as the carrier gas. The column is operated in such a manner that the retention time of fluorotrichloromethane is approximately 30 min. after the air peak elutes. Table I gives the distribution of products isolated by the chromatography procedure and their respective elution times. Some variations in the relative amounts of products are observed in different experiments.

TABLE I

| Components of the product mixture | Relative retention time under described conditions ($T_{CFCl_3}=100$) | Percentage of product mixture as determined by chromatography (uncorrected) |
|---|---|---|
| Air, $O_2$ | 0.0 | |
| $CF_4$, $SiF_4$, $NF_3$ | 0.6 | 0.3 |
| $CO_2$, $N_2O$ | 1.9 | 6.3 |
| $COF_2$ | 2.9 | 2.3 |
| $CF_3OF$ | 5.7 | 0.5 |
| $CF_3NF_2$ | 7.3 | 0.4 |
| $CF_2(OF)_2$+trace $CF_3OOF$ | 9.9 | 18.5 |
| $F\overset{O}{\underset{\|}{C}}CN$ | 13.4 | 0.3 |
| $CF_3OCF_3$ | 17.2 | Trace |
| $CF_3NO_2$ | 19.1 | 0.5 |
| $FONO_2$ | 24.2 | 0.4 |
| $F_2NCF_2NF_2$ | 32.2 | 1.4 |
| Unknown | 38.8 | Trace |
| $CF_3OO\overset{O}{\underset{\|}{C}}F$ (Table II) | 48.7 | 5.2 |
| $CF_3OOOCF_3$ | 59.6 | 0.4 |
| $CF_3OOCF_2OF$ | 71.0 | Trace |
| 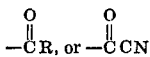 | 78.3 | Trace |
| $CFCl_3$ | 100.0 | 45.0 |
| $(F_2N)_3CF$ | 181.2 | 17.2 |
| $(F_2N)_3CCN$, $CF_3OO\overset{O}{\underset{\|}{C}}OOCF_3$ (Table III) | | |
| $(F_2N)_2CFNO_2$, $CF_3OO\overset{O}{\underset{\|}{C}}-$ CN+uncharacterized products | >200 | 1.3 |

The components in the product mixture with retention times of 200 and higher are pooled (by backflushing the chromatography column described above after the $(F_2N)_3CF$ has eluted) and then rechromatographed under different conditions. For this purpose a column 2 meters in length and ½ inch in diameter packed with silicone gum rubber (commercially available as SE–30, from General Electric Company) (20%), coated on 30–60 mesh acid-washed diatomaceous earth (80%) and maintained at about 25° C. is used. An 8-volt thermistor is used as a detector and helium is used as the carrier gas.

The products are collected by preparative gas chromatography techniques. Previously known compounds are identified by comparison of their infrared and NMR spectra with the spectra of authentic samples.

Novel compounds of the invention are further characterized as follows:

Fluoroformyl perfluoromethyl peroxide

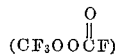

is a colorless gas at room temperature which is readily hydrolyzed by water, but can be stored over at least several months at room temperature with no decomposition in carefully and thoroughly dried glass vessels. This compound is a useful oxidizing agent and must not be contaminated by oxidizable materials. Table II summarizes the physical characteristics and analytical data for this compound.

TABLE II

Fluoroformyl perfluoromethyl peroxide, $CF_3OOCF$

Infrared spectrum:
  Strong absorptions at 5.20, 7.70, 8.05 and 8.60 microns.
  Medium absorptions at 9.95 and 10.75 microns.

$F_{19}$ NMR spectrum:

| | | |
|---|---|---|
| Absorptions | 32.4$\phi$ | 69.5$\phi$. |
| Area ratio | 1 | 3. |
| Character | Fourfold | Doublet. |
| Coupling constant | 2.0 c.p.s. | 2.0 c.p.s. |
| Assignment | F$\overset{O}{\underset{\|\|}{C}}$— | —CF$_3$ |

Mass cracking pattern:
  Prominent peaks at m/e=28(CO$^+$), 44(CO$_2^+$), 47(COF$^+$), 63(CO$_2$F$^+$), 66(CF$_2$O$^+$), 69(CF$_3^+$).
  Highest two mass numbers observed at m/e=129 (parent minus one fluorine) and m/e=148 (parent).

Elemental analysis:
  Calculated for C$_2$F$_4$O$_3$: 16.23% C; 51.34% F; M.W., 148.
  Found: 16.26, 16.07% C; 49.1, 50.1% F; 144 (by gas density); 138 (by effusion rate in mass spectrometer).

Oxidizing power (in meq. iodine released per g. sample):

Calculated for $CF_3OOCF$: 13.51
Found: 13.3

Bis(perfluoromethyl) bis(peroxy)carbonate is a clear, colorless, volatile liquid at room temperature. It readily undergoes hydrolysis by water to CO$_2$ and CF$_3$OOH but can be stored in thoroughly dried glass apparatus. Samples stored in this manner at room temperature show no sign of decomposition after several months. This compound is a useful oxidizing agent and must be kept free from oxidizable continents. Table III summarizes physical and analytical data.

TABLE III

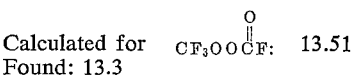

Bis(perfluoromethyl)bis(peroxy)carbonate, $CF_3OOCOOOCF_3$

Infrared spectrum: (20-25 mm. Hg pressure, 25 mm. cell)

| Wavelength (microns) | Intensity | Character |
|---|---|---|
| 5.24 | Medium | Moderately sharp. |
| 7.70 | Strong | |
| 8.03 | Very strong | |
| 8.18 | Strong | All moderately sharp. Some overlap. |
| 8.77 | do | |
| 8.95 | Very strong | |
| 10.60 | Very weak | Broad. |
| 13.65 | Weak | Very broad. |

$F^{19}$ NMR spectrum:
  Sharp singlet absorption at 69.6$\pi$ (—CF$_3$).
Mass cracking pattern:
  Prominent peaks at m/e:
    =28(CO$^+$), 44(CO$_2^+$), 47(CFO$^+$), 66(CF$_2$O$^+$), 69(CF$_3^+$, largest peak), 113(C$_2$F$_3$O$_2^+$) and 129(C$_2$F$_3$O$_3^+$),
    =129 is approximately 20% of CF$_3^+$ peak and is highest mass number observed except for very small traces.

Cyanoformyl perfluoromethyl peroxide,

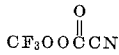

is a useful oxidant volatile liquid at ambient temperatures. It hydrolyzes readily with water in the gas phase to give perfluoromethyl hydroperoxide, carbon dioxide and hydrogen cyanide. It is characterized by a strong singlet absorption peak at +68.7$\phi$ in the fluorine NMR spectrum which is assigned to the CF$_3$OO— group. The infrared spectrum has absorptions:

| | | |
|---|---|---|
| 4.44$\mu$ | Weak | CN group. |
| 5.46$\mu$ | Moderate | C=O group. |
| 7.70$\mu$ | Strong | |
| 8.03$\mu$ | do | |
| 8.25$\mu$ | do | Unassignd. |
| 8.90$\mu$ | do | |

EXAMPLE 2

A clean, dry 10 ml. borosilicate glass reaction vessel equipped with a Fischer and Porter Teflon valve is charged with 7.0 $\mu$l. distilled water. The reactor is then attached to the vacuum line and cooled in a bath of liquid nitrogen. Into the reactor is transferred under reduced pressure 0.22 mmole of fluoroformyl perfluoromethyl peroxide, prepared and isolated by the procedures described in Example 1. The reactor is then sealed with the Fischer and Porter valve and allowed to stand at room temperature for one hour.

The equation for this reaction is as follows:

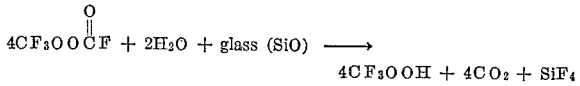

$$4CF_3OOCF + 2H_2O + \text{glass (SiO)} \longrightarrow 4CF_3OOH + 4CO_2 + SiF_4$$

The reaction mixture is then fractionated by distillation at less than 1 mm. pressure through Trap A and into Trap B, cooled respectively at —110° C. and —196° C. At the conclusion of the fractionation Trap A is found to contain 0.14 mmole of perfluoromethyl hydroperoxide (Table IV) contaminated slightly by water. Trap B is found to contain 0.18 mmole of material which is chiefly carbon dioxide and silicon tetrafluoride with a small amount of perfluoromethyl hydroperoxide.

The perfluoromethyl hydroperoxide from Trap A is further purified by distillation at less than 1 mm. pressure through Trap C (cooled by a slush bath of solid carbon dioxide and trichloroethylene at —78° C. and into Trap D (cooled by a bath of liquid nitrogen at —196° C.). Trap D is then found to contain 0.097 mmole pure perfluoromethyl hydroperoxide. Trap C is found to contain chiefly water and traces of the hydroperoxide.

Perfluoromethyl hydroperoxide is a volatile liquid boiling near room temperature at 760 mm. pressure. It is a useful oxidizing agent and rapidly liberates iodine from aqueous solutions of potassium iodide. The hydroperoxide is stable for several months at room temperature in glass apparatus, even in the presence of moisture. The characterization of perfluoromethyl hydroperoxide by its chemical and spectral properties is summarized in Table IV.

Similarly compounds such as

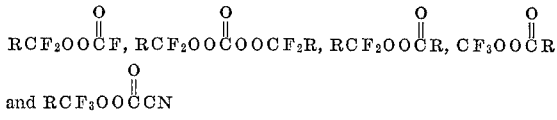

give the corresponding perfluoroalkane hydroperoxides upon hydrolysis.

TABLE IV

Perfluoromethyl hydroperoxide, $CF_3OOH$

Infrared spectrum: (27 mm. Hg pressure, 25 mm. cell)

| Wavelength (microns) | Intensity | Character |
|---|---|---|
| 2.80 | Medium | Very sharp. |
| 7.22 | do | Complex. |
| 7.85 | Very strong | Do. |
| 8.14 | do | Do. |
| 8.95 | Very weak | |
| 10.58 | do | |

$F_{19}$NMR spectrum:
Sharp singlet absorption at $70.7\phi$ ($-CF_3$).

Mass cracking pattern:
Prominent peaks are found at $m/e=47(CFO^+)$ and $69(CF_3^+$; largest peak).
Medium intensity peaks are found at $m/e=20(HF^+)$, $28(CO^+)$, $44(CO_2^+)$, $66(CF_2O^+)$ and $67(CF_2OH^+)$.
Lower intensity peaks are found at $m/e=16(O^+)$, $17(OH^+)$, $19(F^+)$, $31(CF^+)$, $32(O_2^+)$, $50(CF_2^+)$, $83(CF_2O_2H^+)$, $85(CF_3O^+)$ and $102(CF_3O_2H^+$; parent).

Elemental analysis:
Calculated for $CHF_3O_2$: 11.77%, C; 55.87%, F; MW, 102.
Found: 11.7, 11.9%, C; 53.4%, 54.8%, F, MW, 105

EXAMPLE 3

A clean, well-dried 75 ml. Hoke stainless steel cylinder (rated at 1800 p.s.i.) equipped with a 2 in. stainless steel nipple and a Hoke No. Y343H stainless steel valve completely free from grease of any kind is conditioned by evacuating and then charging to 1 atm. pressure with fluorine at room temperature. After one day, fluorine is discharged, and the cylinder is opened in a dry box (<4 p.p.m. moisture content) and, while still therein, is charged with 3.0 g. of finely ground cesium fluoride (used as obtained commercially) and reassembled. The cylinder is first heated overnight in a bath maintained at 150° C. while under less than 1 mm. pressure to dry the cesium fluoride thoroughly and is then filled at 1 atm. pressure with fluorine and kept at room temperature in this manner for at least one day. The cylinder and catalyst are then ready for use.

The fluorine is removed from the cylinder, the cylinder containing cessium fluoride is cooled in a bath of liquid nitrogen, pure bis(perfluoromethyl) bis(peroxy)carbonate (0.097) mmole is condensed therein under reduced pressure, 0.33 mmole fluorine is charged at liquid nitrogen temperature, the cylinder valve is closed and the cylinder is placed in a bath at −78° C., where it is allowed to remain for twenty-one hours. The reaction is:

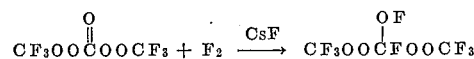

After this period of time the cylinder is again cooled in a bath of liquid nitrogen, and the non-condensible gases are removed under vacuum. The cylinder is then allowed to warm to room temperature, and the volatile materials therein are transferred to the vacuum line. There is obtained 0.083 mmole of pure fluoroxybis(perfluoromethylperoxy)fluoromethane having the properties described below.

The cylinder containing catalyst may be filled to 1 atm. pressure with fluorine and stored at room temperature for reuse.

Similarly other compounds of the structure

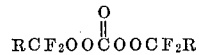

provide fluoroxybis (perfluoroalkylperoxy) perfluoroalkanes.

Fluoroxybis (perfluoromethylperoxy) fluoromethane,
$(CF_3OO)_2CFOF$, is characterized by its infrared and NMR spectra, mass cracking pattern and elemental analysis.

The infrared spectrum has very strong complex absorption in the region of 7.70–8.10$\mu$ with peaks at 7.73$\mu$, 7.88$\mu$ and 8.02$\mu$; strong complex absorption with peaks at 8.60$\mu$ and 8.87$\mu$; and weak broad absorption at 10.6$\mu$.

The n.m.r. spectrum has three absorption peaks in the approximate ratio 1:6:1 at $-168.0\phi$, $+68.7\phi$ and $+90.6\phi$, respectively. The peak at $+68.7\phi$ is a doublet with a coupling constant of approximately 3.5 c./s. and is assigned to the fluorines of the $CF_3$ group in the product. The peaks at $-168.0\phi$ and at $+90.6\phi$ are both overall doublets with coupling constants near 25 c./s. Further fine structures in these peaks are also present under conditions of high resolution. On the basis of positions of the absorptions, the absorption at $-168.0\phi$ is assigned to the fluorine of the OF group and the absorption at $+90.6\phi$ is assigned to the fluorine of the CF group.

Analysis.—Calculated for $C_3F_8O_5$ (percent): 13.43 C, 56.72 F. Found (percent): 13.05 C, 55.50 F.

Fluoroxybis(perfluoromethylperoxy)fluoromethane is an oxidizing agent which liberates iodine from an aqueous solution of potassium iodide. This product is stable at room temperature. A sample of fluoroxybis(perfluoromethylperoxy)fluoromethane in trichlorofluoromethane stored at room temperature in a glass n.m.r. tube over a period of several months shows no decomposition.

The mass cracking pattern of fluoroxybis(perfluoromethylperoxy)fluoromethane shows prominent peaks at mass numbers (m/e) $44(CO_2^+)$, $47(CFO^+$, largest peak) and $69(CF_3^+)$. Medium intensity peaks appear at mass numbers $28(CO^+)$, $63(CFO_2^+)$ and $66(CF_2O^+)$. Peaks of somewhat lower intensity appear at mass numbers $16(O^+)$, $19(F^+)$, $31(CF^+)$, $32(O_2^+)$, $50(CF_2^+)$, $85(CF_3O^+)$, $113(C_2F_3O_2^+)$ and $129(C_2F_3O_3^+)$. The absence of peaks in the pattern corresponding to fragments containing carbon to carbon bonds or elements other than C, F and O is further evidence for the structure.

EXAMPLE 4

The apparatus described in Example 1 is thoroughly cleaned and dried and then charged with 248.3 mg. of dry reagent potassium cyanide and 0.25 ml. of dry perfluorotributylamine. Pure perfluoroformamidine (0.80 mmole) is condensed in the reaction vessel, the cooling bath is removed, and the reaction vessel is allowed to warm to room temperature. After stirring for a few minutes, the reactor is again cooled to about −196° C. and is charged under reduced pressure with 1.06 mmole 1,1-bis-(fluoroxy)perfluoroethane. The reactor is sealed with a Fischer and Porter valve and placed in a slush bath at −110° C., which is allowed to warm slowly to room temperature overnight. The reaction mixture is stirred with a magnetic stirring bar as it warms and at room temperature for eight hours thereafter. It is then cooled at −30° C., and the volatile components at that temperature are transferred to the vacuum line. The products are fractionated by distillation at less than 1 mm. pressure through traps at about −110° C. and −196° C., respectively.

After fractionation the −110° C. trap contains 0.31 mmole of product which is chiefly perfluoroacetyl perfluoroethyl peroxide, perfluoroacetyl perfluoromethyl peroxide, fluoroformyl perfluoroethyl peroxide and difluoraminonitroperfluoromethane, as well as small amounts of other novel compounds not further characterized, such as cyanoformyl perfluoroethyl peroxide and bis(perfluoroethyl) bis(peroxy)carbonate. The −196° C. trap contains 1.44 mmoles of product mixture, the components of which are separated by vapor phase chromatography and are as shown in Table V. Some variations in the relative amounts of products are observed in different experiments.

TABLE V
Products in −196° C. Trap

| Component | Percentage of product mixture as determined by chromatography (uncorrected) |
|---|---|
| Air, O$_2$ | |
| CF$_4$, NF$_3$, SiF$_4$ | 2.9 |
| CO$_2$, N$_2$O, COF$_2$ | 21.4 |
| CF$_3$NF$_2$ | 1.4 |
| $\text{CF}_3\overset{\text{O}}{\underset{\|}{\text{C}}}\text{F}$ | 17.7 |
| CF$_3$OCF$_3$ | 0.8 |
| CF$_3$NO$_2$ | 1.9 |
| CF$_3$OOCF$_3$ | 3.1 |
| $\text{CF}_3\overset{\text{O}}{\underset{\|}{\text{C}}}\text{CN}$ | Trace |
| F$_2$NCF$_2$NF$_2$ | 49.6 |
| $\text{CF}_3\text{OO}\overset{\text{O}}{\underset{\|}{\text{C}}}\text{F}$ | 0.8 |
| CF$_3$OOCF$_3$ | 0.4 |
| Unidentified components | Traces |

The components of the −110° C. trap are separated and isolated by vapor phase chromatography using a 6-meter column of silicone gum rubber similar to the 2-meter silicone gum rubber column described in Example 1 and following the procedures described therein.

Novel compounds of the invention prepared in this example are further characterized as follows:

Perfluoroacetyl perfluoroethyl peroxide is a volatile liquid with a boiling point near room temperature at 1 atm. pressure. This compound is stable at room temperature if stored in carefully dried apparatus. In the presence of moisture or by the procedure of Example 2, hydrolysis occurs readily to perfluoroacetic acid and perfluoroethyl hydroperoxide. This compound is an oxidizing agent and must not be contaminated by oxidizable materials. Table VI summarizes the physical characteristics and analytical data for this compound. Perfluoroacetyl perfluoroethyl peroxide can also be named perfluoroethyl perfluoroperacetate.

TABLE VI

Perfluoroacetyl perfluoroethyl peroxide, $\text{CF}_3\overset{\text{O}}{\underset{\|}{\text{C}}}\text{OOCF}_2\text{CF}_3$ Infrared spectrum:
  Absorptions at 5.36μ (medium), 7.25μ (weak), 7.68μ (weak), 8.04μ (strong), 8.33μ (strong), 9.13μ (medium), and 9.40μ (strong).

F$^{19}$ N.M.R. spectrum:

$$\text{CF}_3-\overset{\text{O}}{\underset{\|}{\text{C}}}-\text{O}-\text{O}-\text{CF}_2-\text{CF}_3$$

Approximate area ratios: 71.7φ (3), 95.1φ (2), 82.7φ (3)

Coupling constants observed under high resolutions are very small (J<2 c./s.) and unresolved.

Mass cracking pattern:
  Prominent peaks appear at mass numbers (m/e) 28(CO$^+$), 31(CF$^+$), 44(CO$_2^+$), 47(COF$^+$), 50(CF$_2^+$), 69(CF$_3^+$, largest peak) and 97(C$_2$F$_3$O$^+$).
  Medium intensity peaks appear at mass numbers 66(CF$_2$O$^+$) and 119(C$_2$F$_5^+$).
  Medium intensity peaks appear at mass numbers 16(O$^+$), 19(F$^+$), 32(O$_2^+$), 70(CF$_3^+$ isotope) and 151(C$_2$F$_5$O$_2^+$, parent molecule minus CF$_3$CO$^+$).
  No significant peaks appear at mass numbers greater than 151.

Elemental analysis:
  Calculated for C$_4$F$_8$O$_3$ (percent): 19.36 C; 61.30 F; MW, 248.
  Found (percent): 19.4 C; 61.3 F; MW, 249 (by gas density), 242 (effusion rate in mass spectrometer at mass numbers 47, 69, 97 and 119).

Perfluoroacetyl perfluoromethyl peroxide is a colorless gas at room temperature. This compound is stable at room temperature if stored in carefully dried apparatus. In the presence of moisture, or by the procedure of Example 2, hydrolysis occurs rapidly to perfluoromethyl hydroperoxide and perfluoroacetic acid. This compound is an oxidizing agent and must not be contaminated by oxidizable materials. Table VII summarizes the physical characteristics and analytical data for this compound. Perfluoroacetyl perfluoromethyl peroxide can also be named perfluoromethyl perfluoroperacetate.

TABLE VII

Perfluoroacetyl perfluoromethyl peroxide, $\text{CF}_3\overset{\text{O}}{\underset{\|}{\text{C}}}\text{OOCF}_3$ Infrared spectrum:
  Absorptions at 5.35μ (medium), 7.70μ (strong), 8.04μ (strong), 8.25μ (strong), 9.35μ (strong), 10.62μ (weak), 11.19μ (weak), 11.79μ (weak) and 13.48μ (weak).

F$^{19}$ n.m.r. spectrum:

$$\text{CF}_3-\overset{\text{O}}{\underset{\|}{\text{C}}}-\text{O}-\text{O}-\text{CF}_3$$
7.2φ                              68.9φ
(singlet)                        (singlet)

Both peaks have the same intensity and approximately the same area.

Mass cracking pattern:
  Largest peak appears at mass number (m/e) 69 (CF$_3^+$).
  Prominent peak appear at mass numbers 28(CO$^+$), 31(CF$^+$), 44(CO$_2^+$), 47(CFO$^+$), 50(CF$_2^+$), 66(CF$_2$O$^+$) and 97(C$_2$F$_3$O$^+$).
  Peaks of much smaller intensity appear at mass numbers 16(O$^+$), 19(F$^+$), 63(CFO$_2^+$) and 151 (C$_2$F$_5$O$_2^+$).

Molecular weight:
  Calculated for C$_3$F$_6$O$_3$: 198.
  Found: (by effusion rates in mass spectrometer) 193 (at m/e=47), 200 (at m/e=50), 195 (at m/e=69 and at m/e=97).

Fluoroformyl perfluoroethyl peroxide is a colorless gas at room temperature. This compound is stable at room temperature if stored in carefully dried apparatus. In the presence of moisture or by procedures of Example 2 above, hydrolysis occurs rapidly to perfluoroethyl hydroperoxide, carbon dioxide and hydrogen fluoride. This compound is an oxidizing agent and must not be contaminated by oxidizable materials. Table VIII summarizes the physical characteristics and analytical data for this compound.

TABLE VIII

Fluoroformyl perfluoroethyl peroxide, $\text{F}\overset{\text{O}}{\underset{\|}{\text{C}}}\text{OOCF}_2\text{CF}_3$ Infrared spectrum:
  Absorptions at 5.21μ (strong), 7.24μ (medium), 8.04μ (strong), 8.30μ (strong), 8.50μ (strong), 9.14μ (strong), 9.34μ (medium), 9.70μ (medium), 10.10μ (medium), 11.05μ (weak), 11.84μ (weak) and 13.39μ (medium).

F$^{19}$ n.m.r. spectrum:

$$\text{F}-\overset{\text{O}}{\underset{\|}{\text{C}}}-\text{O}-\text{O}-\text{CF}_2-\text{CF}_3$$

Approximate area ratios: ~33φ (1), 95.8φ (2), 83.0φ (3)

Coupling constants observed under high resolution are very small (J<2 c./s.) and unresolved.

Mass cracking pattern:
  Largest peak appears at mass numbers (m/e) 69 (CF$_3^+$).

Prominent peaks appear at mass numbers $44(CO_2^+)$, $47(CFO^+)$ and $119(C_2F_5^+)$.

Medium intensity peaks appear at mass numbers $28$ $(CO^+)$, $31(CF^+)$, $50(CF_2^+)$, $66(CF_2O^+)$ and $129$ $(C_2F_3O_3$, parent molecule minus $CF_3)$.

Peaks of much smaller intensisty appear at mass numbers $19(F^+)$, $22(CO_2^{++})$, $63(CFO_2^+)$, $97$ $(C_2F_3O^+)$ and $116(C_2F_4O^+)$.

Molecular weight:

Calculated for $C_3F_6O_3$: 198.

Found: (by effusion rates in mass spectrometer) 184 (at m/e=69), 190 (at m/e=100), 195 (at m/e=97) and (at m/e=116), 192 (at m/e=119) and 183 (at m/e=129).

What is claimed is:

1. A compound selected from the group consisting of:
   (a) perfluoroalkane hydroperoxides,
   (b) fluoroformyl perfluoroalkyl peroxides,
   (c) cyanoformyl perfluoroalkyl peroxides,
   (d) perfluoroacetyl perfluoroalkyl peroxides,
   (e) bis(perfluoroalkyl) bis(peroxy)carbonates,
   (f) fluoroxybis(perfluoroalkylperoxy)perfluoroalkanes.

2. The compound perfluoromethyl hydroperoxide.

3. The compound fluoroformyl perfluoromethyl peroxide.

4. The compound fluoroformyl perfluoroethyl peroxide.

5. The compound bis(perfluoromethyl) bis(peroxy) carbonate.

6. The compound fluoroxybis(perfluoromethylperoxy) fluoromethane.

7. The compound perfluoroacetyl perfluoromethyl peroxide.

8. The compound perfluoroacetyl perfluoroethyl peroxide.

9. The compound cyanoformyl perfluoromethyl peroxide.

References Cited

UNITED STATES PATENTS

| 3,230,263 | 1/1966 | Porter et al. | 260—610 |
| 3,230,264 | 1/1966 | Porter et al. | 260—610 |

OTHER REFERENCES

Snelling Chemical Reviews, vol. 65, 1965, pages 385 and 394.

LELAND A. SEBASTIAN, Primary Examiner

U.S. Cl. X.R.

260—610; 149—109

UNITED STATES PATENT OFFICE
CERTIFICATE OF CORRECTION

Patent No. 3,541,128      Dated November 17, 1970

Inventor(s) Richard L. Talbott

It is certified that error appears in the above-identified patent and that said Letters Patent are hereby corrected as shown below:

| | reads | should rea[d] |
|---|---|---|
| Column 4 line 47 | 5.2 | 5.4 |
| Column 4 line 48 | 0.4 | 0.2 |
| Column 4 line 49 | tracə | trace |
| Column 4 lines 60, 61 & 62 | $(F_2N)_2CFNO_2, CF_3OO\overset{O}{\overset{\|}{C}}-CN$+uncharacterized products | $(F_2N)_2CFNO_2, CF_3OO\overset{O}{\overset{\|}{C}}-CN$ Uncharacterized produc[ts] |
| Column 5 lines 20 & 21 | $CF_3OOCF$ | $CF_3OO\overset{O}{\overset{\|}{C}}F$ |
| Column 5 line 26 | $F_{19}$ | $F^{19}$ |
| Column 6 line 2 | 69.6π | 69.6∅ |
| Column 6 line 8 | =129 | peak at m/e = 1[29] |
| Column 6 line 42 | (SiO) | ($SiO_2$) |
| Column 7 line 14 | $F_{19}$ | $F^{19}$ |
| Column 7 line 48 | cessium | cesium |
| Column 9 line 67 | Medium | Lower |
| Column 10 line 27 | 7.2∅ | 72.0∅ |

SIGNED AND SEALED

MAR 9 1971

(SEAL)

Attest:

Edward M. Fletcher, Jr.

Attesting Officer

WILLIAM E. SCHUYLER, JR
Commissioner of Patents